(12) United States Patent
Knuuttila et al.

(10) Patent No.: US 6,506,858 B1
(45) Date of Patent: Jan. 14, 2003

(54) OLEFIN POLYMERIZATION CATALYST MATERIAL AND PROCESS FOR ITS PREPARATION

(75) Inventors: Hikka Knuuttila, Porvoo; Kallee Kallio, Vanhakyla; Ove Andell, Helsinki, all of (FI)

(73) Assignee: Borealis A/S, Lyngby (DK)

( * ) Notice: Subject to any disclaimer, the term of this patent is extended or adjusted under 35 U.S.C. 154(b) by 0 days.

(21) Appl. No.: 09/557,175

(22) Filed: Apr. 21, 2000

Related U.S. Application Data

(63) Continuation of application No. PCT/GB98/03171, filed on Oct. 23, 1998, now abandoned.

(30) Foreign Application Priority Data

Oct. 23, 1997 (GB) .............................................. 9722447

(51) Int. Cl.⁷ ............................ C08F 4/602; C08F 10/00
(52) U.S. Cl. ...................... 526/161; 526/133; 526/172; 502/104; 502/120; 502/129; 502/167
(58) Field of Search ................................ 502/104, 120, 502/129, 167; 526/172, 133

(56) References Cited

FOREIGN PATENT DOCUMENTS

| EP | 0 026 987 A | 4/1981 |
|---|---|---|
| EP | 0 285 443 A | 10/1988 |
| EP | 0 367 597 A | 5/1990 |
| EP | 0 416 928 A | 3/1991 |
| EP | 0 608 054 A | 7/1994 |
| EP | 0 628 574 A | 12/1994 |
| EP | 0 683 180 A | 11/1995 |

*Primary Examiner*—David W. Wu
*Assistant Examiner*—Caixia Lu
(74) *Attorney, Agent, or Firm*—Karen Lee Orzechowski; Liniak, Berenato & White, LLC

(57) ABSTRACT

A process for the preparation of a catalyst material and the resultant catalyst material. The process comprises the steps of: (a) treating a particulate support material with an alkylating agent; (b) contacting the alkylating agent treated support material with a procatalyst; optionally (c) contacting the support material with an ionic catalyst activator, and optionally (d) recovering the catalyst-carrying support material. The process allows the simple and effective alkylation of procatalysts, such as metallocene procatalysts. The procatalyst comprises at least one triaza containing ligand.

20 Claims, No Drawings

OLEFIN POLYMERIZATION CATALYST MATERIAL AND PROCESS FOR ITS PREPARATION

This application is a continuation of the U.S. designation of International Application PCT/GB98/03171 filed Oct. 23, 1998, now abandoned.

This invention relates to catalyst materials, their preparation and their use in olefin polymerization.

The use of metallocenes, e.g. cyclopentadienyl or indenyl complexes of metals such as Ti, Zr and Hf, in olefin polymerization catalyst systems is well known.

Metallocene procatalysts are generally used as part of a catalyst system-which also includes an ionic cocatalyst or catalyst activator, for example an aluminoxane (e.g. methylaluminoxane (MAO), hexaisobutylaluminoxane, and tetraisobutylaluminoxane) or a boron compound (e.g. a fluoroboron compound such as triphenylpentafluoroboron ($B(C_6F_5)_3$) or triphenylcarbenium tetraphenylpentafluoroborate (($(C_6H_5)_3C^+B^-(C_6F_5)_4$)).

However, where a metallocene procatalyst which does not contain alkyl (especially methyl) ligands is used, it is necessary to react the procatalyst with a material which serves to introduce alkyl ligands. MAO can perform this function but in the case of non-aluminoxane cocatalysts it is necessary to react the metallocene with an alkylating agent so as to introduce the alkyl ligands.

This however has the disadvantage that the alkylated metallocene has to be separated from the excess reagents and by-products and purified before being heterogenised, ie. loaded onto a catalyst support.

It has now been found that alkylation of certain procatalysts, e.g. metallocene procatalysts may be effected in a particularly simple and straightforward manner by loading the procatalyst onto a particulate catalyst support which has been pre-treated with an alkylating agent.

Thus viewed from one aspect the invention provides a process for the preparation of a catalyst material, said process comprising the steps of:

(a) treating a particulate support material with an alkylating agent;

(b) contacting the alkylating agent treated support material with a procatalyst, e.g. a metallocene procatalyst; optionally (c) contacting the support material with an ionic catalyst activator; and optionally (d) recovering the catalyst-carrying support material.

In the process of the invention, the particulate support material is preferably an inorganic material, especially preferably a metal or pseudo metal oxide such as silica, alumina or zirconia or a mixed oxide such as silica-alumina, in particular silica, alumina or silica-alumina. Particularly preferably, the support material is acidic, e.g. having an acidity greater than or equal to silica, more preferably greater than or equal to silica-alumina and even more preferably greater than or equal to alumina. The acidity of the support material can be studied and compared using the TPD (temperature programmed desorption of gas) method. Generally the gas used will be ammonia. The more acidic the support, the higher will be its capacity to adsorb ammonia gas. After being saturated with ammonia, the sample of support material is heated in a controlled fashion and the quantity of ammonia desorbed is measured as a function of temperature.

Especially preferably the support is a porous material so that the metallocene may be loaded into the pores of the support, e.g. using a process analogous to those described in WO94/14856 (Mobil), WO95/12622 (Borealis) and WO96/00243 (Exxon). The particle size is not critical but is preferably in the range 5 to 200 μm, more preferably 20 to 80 μm.

Before treatment with the alkylating agent, the particulate support material is preferaby calcined, ie heat treated, preferably under a non-reactive gas such as nitrogen. This treatment is preferably at a temperature in excess of 100° C., more preferably 200° C. or higher, e.g. 200–700° C., particularly about 300° C. The calcination treatment is preferably effected for several hours, e.g. 2 to 30 hours, more preferably about 10 hours. It is thought that this calcination has the effect of optimizing the reaction of the alkylating agent with acid hydroxyl groups on the support material.

The treatment of the support with the alkylating agent may be effected using an alkylating agent in a gas or liquid phase, e.g. in an organic solvent for the alkylating agent. The alkylating agent may be any agent capable of introducing alkyl groups, preferably $C_{1-6}$ alkyl groups and most especially preferably methyl groups. Such agents are well known in the field of synthetic organic chemistry. Preferably the alkylating agent is an organometallic compound, especially an organoaluminium compound (such as trimethylaluminium (TMA), dimethyl aluminium chloride, triethylaluminium) or a compound such as methyl lithium, dimethyl magnesium, triethylboron, etc.

The quantity of alkylating agent used will depend upon the number of active sites on the surface of the carrier. Thus for example, for a silica support, surface hydroxyls are capable of reacting with the alkylating agent. In general, an excess of alkylating agent is preferably used with any unreacted alkylating agent subsequently being washed away.

Where an organoaluminium alkylating agent is used, this is preferably used in a quantity sufficient to provide a loading of at least 0.1 mmol Al/g carrier, especially at least 0.5 mmol Al/g, more especially at least 0.7 mmol Al/g, more preferably at least 1.4 mmol Al/g carrier, and still more preferably 2 to 3 mmol Al/g carrier. Where the surface area of the carrier is particularly high, lower aluminium loadings may be used. Thus for example particularly preferred aluminium loadings with a surface area of 300–400 m²/g carrier may range from 0.5 to 3 mmol Al/g carrier while at surface areas of 700–800 m²/g carrier the particularly preferred range will be lower.

Following treatment of the support material with the alkylating agent, the support is preferably removed from the treatment fluid and any excess treatment fluid is allowed to drain off.

The treated support material is then loaded with the procatalyst, preferably using a solution of the procatalyst in an organic solvent therefor, e.g. as described in the patent publications referred to above. Preferably, the volume of procatalyst solution used is from 50 to 500% of the pore volume of the carrier, more especially preferably 80 to 120%. The concentration of procatalyst compound in the solution used can vary from dilute to saturated depending on the amount of metallocene active sites that it is desired be loaded into the carrier pores.

The metal of the procataylst may be any metal effective in olefin polymerization, e.g. a metal of group 3 to 8, especially preferably a transition metal or lanthanide, in particular Ti, Zr or Hf.

The procatalyst of use according to the invention may be a metallocene or a non-metallocene although metallocene procataylsts are preferred.

Where the procatalyst is a non-metallocene, i.e does not comprise a cyclopentadienyl ligand or ligand derived from a cyclopentadienyl moiety such as indenyl, the metal atom is coordinated by at least one suitable sigma or η bonding ligand, preferably a η bonding ligand. In a preferred embodiment the η bonding ligand is a heterocyclic group, especially one comprising a fused ring system. In a most preferred embodiment said ring system comprises 3 nitrogen atoms attached to the same carbon atom, one of said atoms forming part of two fused rings. Suitable heterocyclic ligands of this type are of formula

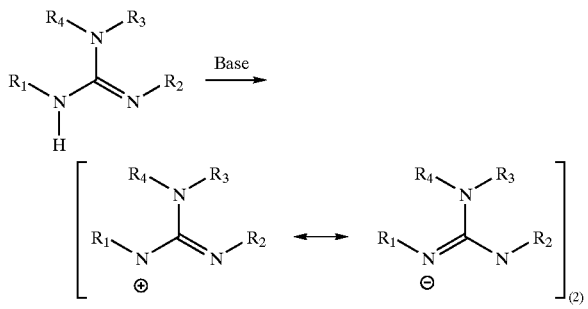

where groups $R_1$, $R_2$, $R_3$ and $R_4$ are the same or different selected from the group of H, $C_1$–$C_{12}$ alkyl, alkenyl, aryl (phenyl preferable), alkylaryl, or the groups $R_1$, $R_2$, $R_3$ and $R_4$ may contain silicon atoms instead of one or more carbon atoms, preferably they are $SiH_3$, $SiH_2R_5$, $SiHR_6R_3$, $SiR_8R_9R_{10}$ groups where groups $R_5$ to $R_{10}$ are also the groups recited above. The substituent groups may be also a combination of several groups recited above. $R_1$ to $R_4$ can also be taken together to form bridged structures. In the presence of a base a balance exists in the formula (2) between two ionic isomeric structures which are presented in the right of the formula (2). Formula (2) preferably represents a triaza bicyclo alkenyl, more preferably a 1,5,7-triazabicyclodec-5-enyl, most preferably a 1,5,7-triaza (4.4.0) bicyclodec-5-enyl.

The non-metallocene may have one or preferably more (e.g. 2 or 3) η-bonding groups and where more than one such group is present these may be linked by a bridging group, e.g. a group providing a 1, 2 or 3 atom chain between such η-bonding groups.

The η-bonding ligands in such non-metallocenes may be simple unsubstituted ligands, but preferably they will be optionally substituted fused ring systems.

The procataylst is however preferably a metallocene. The metallocene procatalyst is preferably a halide, more especially preferably a chloride.

The metallocene may have one or preferably more (e.g. 2 or 3) η-bonding groups and where more than one such group is present these may be linked by a bridging group, e.g. a group providing a 1, 2 or 3 atom chain between such η-bonding groups. The η-bonding groups may be cyclopentadienyl groups optionally carrying ring substituents which may be pendant groups, fused rings, bridging groups to other cyclopentadienyl rings or groups which themselves directly coordinate the metal. Such ligands are well known from the technical and patent literature relating to metallocene olefin polymerization catalysts, e.g. EP-A-35242 (BASF), EP-A-129368 (Exxon), EP-A-206794 (Exxon), PCT/FI97/00049 (Borealis), EP-A-318048, EP-A-643084, EP-A-69951, EP-A-410734 and EP-A-128045.

The η-bonding ligands in such metallocenes may be simple unsubstituted cyclopentadienyl rings, but preferably they will be optionally substituted fused ring systems (eg. indenyl ligands), substituted cyclopentadienyl rings, optionally substituted bridged bis-cyclopentadienyl ligands or optionally substituted bridged bis fused ring systems (eg. bis indenyl ligands). Suitable examples are discussed for example in EP-B-35242 (BASF), EP-B-129368 (Exxon) and EP-B-206794 (Exxon).

Examples of metallocene procatalysts which may be used in the process of the invention include the metallocene compounds with a one or two atom long bridge joining the cyclopentadienyl rings, eg. a ethylene bridge or a bridge $R_2X$ where X is carbon or silicon and R is alkyl, aryl, aralkyl, etc. (for example a methyl, benzyl, etc group typically containing up to 10 carbons). Preferably, a ring position on the cyclopentadienyl rings adjacent the bridge attachment position is substituted, for example by an alkyl group such as methyl. The metal of the metallocene may conveniently be any group 3 to 8 metal, preferably titanium, zirconium or hafnium. Examples of such metallocenes include:

dimethyl-silyl{bis-(2-methyl-4-tert.butyl)}zirconium-dichloride;
dimethyl-silyl{bis-(2-methyl-4-phenyl-indenyl)}zirconium-dichloride;
dimethyl-silyl{bis-(2-methyl-4-naphthyl-indenyl)}zirconium-dichloride;
dimethyl-silyl{bis-(2-methyl-4,6-di-isopropyl-indenyl)}zirconium-dichloride;
dimethyl-silyl{bis-(2-methyl-4,7-dimethyl-indenyl)}zirconium-dichloride;
dimethyl-silyl{bis-(2-methyl-benz[e]-indenyl)}zirconium-dichloride;
dimethyl-silyl{bis-(fluorenyl)}zirconium-dichloride;
rac-[ethylenebis(2-(tert)-butyldimethylsiloxy)indenyl)]-zirconium-dichloride;
dimethyl-silyl{bis-(2-methyl-4-tert.butyl)}hafnium-dichloride;
dimethyl-silyl{bis-(2-methyl-4-phenyl-indenyl)}hafnium-dichloride;
dimethyl-silyl{bis-(2-methyl-4-naphthyl-indenyl)}hafnium-dichloride;
dimethyl-silyl{bis-(2-methyl-4,6-di-isopropyl-indenyl)}hafnium-dichloride;
dimethyl-silyl{bis-(2-methyl-4,7-dimethyl-indenyl)}hafnium-dichloride;
dimethyl-silyl{bis-(2-methyl-benz[e]-indenyl)}hafnium-dichloride;
dimethyl-silyl{bis-(fluorenyl)}hafnium-dichloride; and
rac-[ethylenebis(2-(tert)-butyldimethylsiloxy)indenyl)]-hafnium-dichloride.

A further class of metallocene procatalyst used in the process of the invention are the η-bonding metal complexes of ligands which contain a η-bonding component (eg. a cyclopentadienyl ring or an analog such as an indenyl ring) and a component (eg. a side chain) capable of co-ordinating to the metal in a non η-bonding fashion.

The metal in such complexes will again conveniently be an ion of a transition metal or lanthanide e.g. a group 3 to 8 metal, for example titanium or zirconium. Examples of such complexes include:

1,2,3,4-tetramethyl,5-(dimethylsilyl-{(tert)-butyl-amido)} (cyclopentadienyl)titanium-dichloride;
1,2,3,4-tetramethyl,5-(dimethylsilyl-{(tert)-butyl-amido)} (cyclopentadienyl)zirconium-dichloride; and
1,2,3,4-tetramethyl,5-(ethylene-{(tert)-butyl-amido)} (cyclopentadienyl)titanium-dichloride.

Another class of metallocene procatalyst which may be used in the process of the invention comprises compounds having one cyclopentadienyl ligand in conjunction with another ligand; eg. (cyclopentadienyl-hydrido-borotrispyrazol)-zirconium dichloride. (Other such materials are disclosed in WO97/17379 (Borealis) and the publications referred to therein).

The metallocene procatalyst may conveniently be a metallocene in which the cyclopentadienyl (or equivalent, eg. indenyl, etc) groups are not joined by a bridge or where the cyclopentadienyl rings are joined by a bridge but the ring positions adjacent the bridge attachment site are unsubstituted. Again the metal may be a transition metal or lanthanide e.g. a group 3 to 8 metal, eg. zirconium. Example of such metallocenes include:

rac-ethylene-bis(1-indenyl)zirconium dichloride;
rac-ethylene-bis(4,5,6,7-tetrahydro-1-indenyl)-zirconium dichloride;
bis(n-butylcyclopentadienyl)zirconium dichloride;
bis(1,2-dimethylcyclopentadienyl)zirconium dichloride;
bis(1,3-dimethylcyclopentadienyl)zirconium dichloride;
bis(4,7-dimethylindenyl)zirconium dichloride;
bis(1,2-ethyl,methylcyclopentadienyl)zirconium dichloride;
bisfluorenylzirconium dichloride;
bisindenylzirconium dichloride;
biscyclopentadienylzirconium dichloride; and
bistetrahydroindenylzirconium dichloride.

The active metal (ie. the metal of the procatalyst) is preferably loaded onto the support material at from 0.1 to 4%, preferably 0.5 to 3.0%, especially 1.0 to 2.0%, by weight metal relative to the dry weight of the support material.

After loading of the procatalyst onto the support material, the loaded support may be recovered for use in olefin polymerization, e.g. by separation of any excess procatalyst solution and if desired drying of the loaded support, optionally at elevated temperatures, e.g. 25 to 80° C.

Alternatively, a non-MAO cocatalyst, e.g. an ionic catalyst activator (such as a boron or aluminium compound, especially a fluoroborate) may also be mixed with or loaded onto the catalyst support material. This may be done simultaneously or more preferably subsequently to loading of the procatalyst, for example by including the further catalyst, cocatalyst or catalyst activator in the solution of the procatalyst or preferably, by contacting the procatalyst loaded support material with a solution of the further catalyst, cocatalyst or catalyst activator, e.g. a solution in an organic solvent. Alternatively however any such further material may be added to the procatalyst loaded support material in the polymerization reactor or shortly before dosing of the catalyst material into the reactor.

In this regard, it is particularly preferred to use a fluoroborate catalyst activator, especially a $B(C_6F_5)_3$ or more especially a $^6B(C_6F_5)_4$ compound, such as $B(C_6F_5)_3$, $C_6H_5N(CH_3)_2H:B(C_6F_5)_4$ or $(C_6H_5)_3C:B(C_6F_5)_4$.

Where such a catalyst activator is used, it is preferably used in a mole ratio to the metallocene of from 0.1:1 to 100:1, especially 1:1 to 0.50:1, particularly 2:1 to 30:1.

Where the further material is loaded onto the procatalyst loaded support material, the support may be recovered and if desired dried before use in olefin polymerization.

The procatalyst loaded support material is novel and forms a further aspect of the invention. Viewed from this aspect the invention provides an olefin polymerization catalyst material comprising a procatalyst-loaded, e.g. metallocene loaded, alkylating agent pre-treated particulate support material, preferably a porous inorganic support material.

Viewed from a yet further aspect the invention provides a method of olefin polymerization wherein polymerization is effected in the presence of a catalyst material comprising a procatalyst-loaded, e.g. metallocene-loaded support material, characterised in that said support material comprises a procatalyst-loaded alkylating agent pre-treated particulate support material, preferably a porous inorganic support material.

In the method of the invention the catalyst material preferably also comprises a non-MAO, more preferably a non-aluminoxane, ionic catalyst activator, in particular a boron compound, especially a fluoroborate compound.

The olefin polymerized in the method of the invention is preferably an alpha-olefin or a mixture of alpha olefins, for example $C_{2-20}$ olefins, e.g. ethylene, propene, n-but-1-ene, n-hex-1-ene, 4-methyl-pent-1-ene, n-oct-1-ene- etc. The olefins polymerized in the method of the invention may include any compound which includes unsaturated polymerizable groups. Thus for example unsaturated compounds, such as $C_{6-20}$ olefins, and polyenes, especially $C_{6-20}$ dienes, may be included in a comonomer mixture with lower olefins, e.g. $C_{2-5}$ α-olefins. Diolefins (ie. dienes) are suitably used for introducing long chain branching into the resultant polymer. Examples of such dienes include α,ω linear dienes such as 1,5-hexadiene, 1,6-heptadiene, 1,8-nonadiene, 1,9-decadiene, etc.

In general, where the polymer being produced is a homopolymer it will preferably be polyethylene or polypropylene. Where the polymer being produced is a copolymer it will likewise preferably be an ethylene or propylene copolymer with ethylene or propylene making up the major proportion (by number and more preferably by weight) of the monomer residues. Comonomers, such as $C_{4-6}$ alkenes, will generally be incorporated to contribute to the mechanical strength of the polymer product.

If desired, the nature of the monomer/monomer mixture and the polymerization conditions may be changed during the polymerization process so as to produce a broad bimodal or multimodal molecular weight distribution (MWD) in the final polymer product. In such a broad MWD product, the higher molecular weight component contributes to the strength of the end product while the lower molecular weight component contributes to the processability of the product, e.g. enabling the product to be used in extrusion and blow moulding processes, for example for the preparation of tubes, pipes, containers, etc.

A multimodal MWD can be produced using a catalyst material with two or more different types of active polymerization sites, e.g. with one such site provided by the metallocene on the support and further sites being provided by further catalysts, e.g. Ziegler catalysts, other metallocenes, etc. included in the catalyst material as discussed above.

Polymerization in the method of the invention may be effected in one or more, e.g. 1, 2 or 3, polymerization reactors, using conventional polymerization techniques, e.g. gas phase, solution phase and slurry polymerization.

For slurry reactors, the reaction temperature will generally be in the range 60 to 110° C. (e.g. 85–110° C.), the reactor pressure will generally be in the range 5 to 80 bar (e.g. 50–65 bar), and. the residence time will generally be in the range 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen together with monomer (e.g. ethylene).

For solution phase reactors, the reaction temperature used will generally be in the range 130 to 270° C., the reactor pressure will generally be in the range 20 to 400 bar and the residence time will generally be in the range 0.1 to 1 hour. The solvent used will commonly be a hydrocarbon with a boiling point in the range 80–200° C.

Generally the quantity of catalyst used will depend upon the nature of the catalyst, the reactor types and conditions and the properties desired for the polymer product. Conventional catalyst quantities, such as described in the publications referred to herein, may be used.

The invention will now be described further with reference to the following non-limiting Examples.

EXAMPLES

Example 1

Catalyst Preparation
Carrier Calcination

Sylopol 55SJ silica was calcinated under nitrogen for 10 hours at 100° C.

Trimethylaluminium Treatment of Silica 1.5 ml of 20 wt % trimethylaluminium solution in pentane was added to 1 g of Sylopol 55SJ silica in a septum bottle. After 2 hours, the carrier was dried under a nitrogen flow at 30° C. for one hour. The Al content of the carrier was 2.84 mmol/g carrier.

Impregnation of Metallocene 42 mg of rac-ethylene-bis(2-tert-butyldimethylsiloxyindenyl) zirconium dichloride was dissolved into 1.5 ml of toluene. 1.4 ml of this solution was added to 1 g of the previously prepared methylated carrier in a septum bottle. After 2 hours, the catalyst was dried in a fume cupboard under a nitrogen flow at 30° C. for one hour. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 153 mg of the catalyst was fed to the autoclave together with 2.8 ml of 3.15 wt % $B(PhF_5)_3$, giving a B/Zr-ratio of 30. After 1 hour of polymerization, the yield of polyethylene was 7 g, giving a catalyst activity of 0.05 kg PE/g cat h.

Polymer Properties

Mw/Mn=6.85, Mw=194 000.

Example 2

Catalyst Preparation
Carrier Calcination

As in Example 1

Trimethylaluminium Treatment of Silica 12.2 ml of 20 wt % TMA in pentane was mixed with 12.8 ml pentane in order to get 1.43 mmol Al in 1.5 ml of solution.

1.5 ml of previously prepared TMA solution was added to 1 g of Sylopol 55SJ silica in a septum bottle. After 2 hours, the methylated carrier was dried as in Example 1. The Al content of the carrier was 1.43 mmol/g carrier.

Impregnation of Metallocene 4.5 ml of toluene was added to 124 mg of rac-ethylene-bis(2-tert-butyldimethylsiloxyindenyl) zirconium dichloride. 1.5 ml of this solution was added to 1 g of methylated Sylopol 55SJ silica. After 2 hours, the catalyst was dried under nitrogen as in Example 1. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 204 mg of the catalyst was fed into the autoclave together with 3.73 ml of 3.15 wt % $B(PhF_5)_3$, giving a B/Zr-ratio of 30. After 1 hour of polymerization, the yield of polyethylene was 1 g giving a catalyst activity of $5 \times 10^{-3}$ kg PE/g cat h.

Example 3

Catalyst Preparation
Carrier Calcination

As in Example 1

Trimethylaluminium Treatment of Silica 2.27 ml of pentane was added to 0.73 ml of 20 wt % TMA solution in pentane in order to reach a concentration of 0.71 mmol of aluminium in 1.5 ml of solution.

1.5 ml of previously prepared TMA solution was added to ig of Sylopol 55SJ silica. After 2 hours, the carrier was dried as in Example 1. The Al content of the carrier was 0.71 mmol/g carrier.

Impregnation of Metallocene 1.4 ml of rac-ethylene-bis(2-tert-butyldimethylsiloxyindenyl) zirconium dichloride solution (prepared as in Example 1) was added to 1 g of previously prepared methylated silica. After 2 hours, the catalyst was dried as in Example 1. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 208 mg of the catalyst was fed into the autoclave together with 3.73 ml of 3.15 wt % $B(PhF_5)_3$, giving a B/Zr-ratio of 30. After 1 hour of polymerization, polyethylene was yielded in trace amounts corresponding to a catalyst activity of 0 kg PE/g cat h.

Example 4

Catalyst Preparation
Carrier Calcination

Sylopol 55SJ silica was calcinated under nitrogen for 10 hours at 300° C.

Trimethylaluminium Treatment of Silica 1.5 ml of TMA solution (prepared as in Example 2) was added to 1 g of Sylopol 55SJ silica. After 2 hours, the carrier was dried as in Example 1. The Al content of the carrier was 1.43 mmol/g carrier.

Impregnation of Metallocene 1.5 ml of rac-ethylene-bis(2-tert-butyldimethylsiloxyindenyl) zirconium dichloride solution (prepared as in Example 2) was added to 1 g previously prepared methylated silica. After 2 hours, the catalyst was dried under a nitrogen flow as in Example 1. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 208 mg of the catalyst was fed into the autoclave together with 3.73 ml of 3.15 wt % $B(PhF_5)_3$, giving a B/Zr-ratio of 30. After 1 hour of polymerization, polyethylene was yielded in trace amounts corresponding to a catalyst activity of 0 kg PE/g cat h.

Example 5

Catalyst Preparation

Carrier Calcination

Sylopol 55SJ silica was calcinated under nitrogen for 10 hours at 600° C.

Trimethylaluminium Treatment of Silica 1.5 ml of TMA solution (prepared as in Example 2) was added to 1 g of Sylopol. After 2 hours, the methylated carrier was dried as in Example 1. The Al content of the carrier was 1.43 mmol/g carrier.

Impregnation of Metallocene 126 mg of rac-ethylene-bls(2-tert-butyldimethylsiloxy-indenyl) zirconium dichloride was dissolved in 4.5 ml of toluene. 1.5 ml of this solution was added to 1 g of previously methylated silica. After 2 hours, the catalyst was dried under a nitrogen flow as in Example 1. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 201 mg of the catalyst was fed into the autoclave together with 3.73 ml of 3.15 wt % $B(PhF_5)_3$, giving a B/Zr-ratio of 30. After 1 hour of polymerization, the yield of polyethylene was 2 g giving a catalyst activity of $1 \times 10^{-2}$ kg PE/g cat h.

Polymer Properties

Mw=257 000, Mw/Mn=8.5.

Example 6

Catalyst Preparation

Carrier Calcination

Silica-alumina was calcinated under nitrogen for 10 hours at 300° C.

Trimethylaluminium Treatment of Silica-alumina 1.5 ml of TMA solution (prepared as in Example 2) was added to 1 g of silica-alumina. After 2 hours, the methylated carrier was dried as in Example 1. The Al content of the carrier was 1.43 mmol/g carrier.

Impregnation of Metallocene 24 mg of rac-ethylene-bis(2-tert-butyldimethylsiloxy-indenyl) zirconium dichloride was dissolved in 3 ml of toluene. 1 ml of this solution was added to 1 g of previously prepared methylated carrier. After 2 hours, the catalyst was dried under a nitrogen flow as in Example 1. The catalyst has a Zr content of 0.1 wt %.

Test Polymerization

Polymerization was carried out in a 3-liter Buchi autoclave in i-butane. The ethylene partial pressure was 5 bar, the temperature was 80° C. and the reaction time was 1 hour. 199 mg of the catalyst was fed into the autoclave together with 3.73 ml of 3.15 wt % $B(PhF_5)_3$, giving a B/Zr-ratio of 30. After 1 hour of polymerization, polyethylene was yielded in trace amounts corresponding to a catalyst activity of 0 kg PE/g cat h.

Example 7

Catalyst Preparation

Carrier Calcination

As in Example 6

Trimethylaluminium Treatment of Silica-alumina

As in Example 6

Impregnation of Metallocene 60 mg of rac-ethylene-bis(2-tert-butyldimethylsiloxy-indenyl) zirconium dichloride was dissolved in 1.5 ml of toluene. 1 ml of this solution was added to 1 g of methylated carrier. After 2 hours, the catalyst was dried under a nitrogen flow. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 203 mg of the catalyst was fed into the autoclave together with 3.73 ml of 3.15 wt % $B(PhF_5)_3$, giving a B/Zr-ratio of 30. After 1 hour of polymerization, the yield of polyethylene was 4 g giving a catalyst activity of 0.02 kg PE/g cat h.

Polymer Properties

Mw=191000, Mw/Mn=7.3.

Example 8

Catalyst Preparation

Carrier Calcination

As in Example 6

Trimethylaluminium Treatment of Silica-alumina

As in Example 6

Impregnation of Metallocene 120 mg of rac-ethylene-bis(2-tert-butyldimethylsiloxy-indenyl) zirconium dichloride was dissolved in 1.5 ml of toluene. 1 ml of this solution was added to 1 g of methylated carrier. After 2 hours, the catalyst was dried under a nitrogen flow. The catalyst has a Zr content of 1.0 wt %.

Test Polymerization

Polymerization was carried out in a 3-liter Buchi autoclave in i-butane. The ethylene partial pressure was 5 bar, the temperature was 80° C. and the reaction time was 1 hour. 208 mg of the catalyst was fed into the autoclave together with 3.73 ml of 3.15 wt % $B(PhF_5)_3$, giving a B/Zr-ratio of 30. After 1 hour of polymerization, the yield of polyethylene was 12 g giving a catalyst activity of 0.06 kg PE/g cat h.

Polymer properties

Mw=152000, Mw/Mn=5.7.

Example 9

Catalyst Preparation

Carrier Calcination

As in Example 6

Trimethylaluminium Treatment of Silica-alumina

As in Example 6

Impregnation of Metallocene 66 mg of n-butylbis(cyclopentadienyl)zirconium chloride was dissolved in 1.5 ml of toluene. 1 ml of this solution was added to 1 g of methylated carrier. After 2 hours the catalyst was dried under a nitrogen flow. The catalyst has a Zr content of 1.0 wt %.

Test Polymerization

Polymerization was carried out in a 3-liter Buchi autoclave in i-butane. The ethylene partial pressure was 5 bar, the temperature was 80° C. and the reaction time was 1 hour. 208 mg of the catalyst was fed into the autoclave together with 3.73 ml of 3.15 wt % $B(PhF_5)_3$, giving a B/Zr-ratio of 30. After 1 hour of polymerization, the yield of polyethylene was 0 g giving a catalyst activity of 0 kg PE/g cat h.

Example 10

Catalyst Preparation

Carrier Calcination

As in Example 6

Trimethylaluminium Treatment of Silica-alumina

As in Example 6

Impregnation of Metallocene 240 mg of rac-ethylene-bis(2-tert-butyldimethylsiloxy-indenyl) zirconium dichloride was dissolved in 2.25 ml of toluene. 1.5 ml of this solution was added to 1 g of methylated carrier. After 2 hours, the catalyst was dried under a nitrogen flow. The catalyst has a Zr content of 2.0 wt %.

Test Polymerisation

Polymerization was carried out in a 3-liter Buchi autoclave in i-butane. The ethylene partial pressure was 5 bar, the temperature was 80° C. and the reaction time was 1 hour. 208 mg of the catalyst was fed into the autoclave together with 3.73 ml of 3.15 wt % $B(PhF_5)_3$, giving a B/Zr-ratio of 30. After 1 hour of polymerization, the yield of polyethylene was 22 g giving a catalyst activity of 0.11 kg PE/g cat h.

Polymer Properties

Melt index MFR21 is 4.97, Mw=192000, Mw/Mn=5.7.

Example 11

Catalyst Preparation

Carrier Calcination

Akzo alumina (grade B) is calcinated in a nitrogen flow at 300° C. for 10 hours.

Trimethylaluminium Treatment of Alumina 1.5 ml of TMA solution (prepared as in Example 2) was added to 1 g of Akzo alumina (grade B). After 2 hours, the methylated carrier was dried under a nitrogen flow. The Al content of the carrier was 1.43 mmol/g carrier.

Impregnation of Metallocene 80 mg of rac-ethylene-bis(2-tert-butyldimethylsiloxyindenyl) zirconium dichloride was dissolved in 2 ml of toluene. 1 ml of this solution was added to 1 g of previously prepared methylated alumina. After 2 hours, the catalyst was dried under a nitrogen flow. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 210 mg of the catalyst was fed into the autoclave together with 3.75 ml of 3.15 wt % $B(PhF_5)_3$, giving a B/Zr-ratio of 30. After 1 hour of polymerization, the yield of polyethylene was 4 g giving a catalyst activity of 0.02 kg PE/g cat h.

Polymer Properties

Mw=213000, Mw/Mn=4.6.

Example 12

Catalyst Preparation

Carrier Calcination

As in Example 11

Trimethylaluminium Treatment of Alumina

As in Example 11

Impregnation of Metallocene 161 mg of rac-ethylene-bis(2-tert-butyldimethylsiloxyindenyl) zirconium dichloride was dissolved in 4 ml of toluene. 1 ml of this solution was added to 1 g of methylated alumina. After 2 hours, the catalyst was dried under a nitrogen flow. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 210 mg of the catalyst was fed into the autoclave together with 3.75 ml of 1.88 wt % $B(PhF_5)_3$, giving a B/Zr-ratio of 15. After 1 hour of polymerization, the yield of polyethylene was 8 g giving a catalyst activity of 0.04 kg PE/g cat h.

Polymer Properties

Mw=196000, Mw/Mn=4.1.

Example 13

Catalyst Preparation

Catalyst Preparation as in Example 12

Test Polymerization

Polymerization was carried out in a 3-liter Buchi autoclave in i-butane. The ethylene partial pressure was 5 bar, the temperature was 80° C. and the reaction time was 1 hour. 205 mg of the catalyst was fed into the autoclave together with 3.55 ml of 1 wt % $Ph_3C^+$ $^-B(PhF_5)_4$ in toluene, giving a B/Zr-ratio of 4. After 1 hour of polymerization, the yield of polyethylene was 22 g giving a catalyst activity of 0.1 kg PE/g cat h.

Polymer Properties

Melt index MFR21 is 9.8, Mw=121000 and Mw/Mn=2.8.

Example 14

Catalyst Preparation

Catalyst Preparation as in Example 12

Test Polymerization

Polymerization was carried out in a 3-liter Buchi autoclave in i-butane. The ethylene partial pressure was 5 bar, the temperature was 80° C. and the reaction time was 1 hour. 201 mg of the catalyst was fed into the autoclave together with 1.76 ml of 1 wt % $Ph_3C^-B(PhF_5)_4$, giving a B/Zr-ratio of 2. After 1 hour of polymerization, the yield of polyethylene was 65 g giving a catalyst activity of 0.32 kg PE/g cat h.

Polymer Properties

Melt index MFR21 is 13.6, Mw=163000 and Mw/Mn=3.9

Example 15

Catalyst Preparation

Carrier calcination

As in Example 11

Trimethylaluminium Treatment of Alumina

As in Example 11

Impregnation of Metallocene 44 mg of n-butylbis(cyclopentadienyl)zirconium chloride was dissolved in 2 ml of toluene. 1 ml of this solution was added to 1 g of previously prepared methylated alumina. After 2 hours, the catalyst was dried under a nitrogen flow. The catalyst has a Zr content of 0.5

Test Polymerization

Polymerization was carried out in a 3-liter Buchi autoclave in i-butane. The ethylene partial pressure was 5 bar, the temperature was 80° C. and the reaction time was 1 hour. 208 mg of the catalyst was fed into the autoclave together with 3.55 ml of 1 wt % $Ph_3C^+$ $^-B(PhF_5)_4$, giving a B/Zr-ratio of 4. After 1 hour of polymerization the yield of polyethylene was 31 g giving a catalyst activity of 0.15 kg PE/g cat h.

Polymer Properties

Mw=113000, Mw/Mn=2.5.

Example 16

Catalyst Preparation

Carrier calcination

Akzo alumina (grade B) is calcinated in a nitrogen flow at 100° C. for 10 hours.

Trimethylaluminium Treatment of Alumina 1.5 ml of 20 wt % TMA solution was added to 1 g of Akzo alumina, calcinated as above. After 2 hours, the methylated carrier was dried under a nitrogen flow. The Al content of the carrier was 2.84 mmol/g carrier.

Impregnation of Metallocene 160 mg of rac-ethylene-bis(2-tert-butyldimethylsiloxyindenyl) zirconium dichloride was dissolved in 2 ml of toluene. 1 ml of this solution was added to 1 g of previously prepared methylated alumina. After 2 hours, the catalyst was dried under a nitrogen flow. The catalyst has a Zr content of 1.0 wt %.

Test Polymerization

Polymerization was carried out in a 3-liter Buchi autoclave in i-butane. The ethylene partial pressure was 5 bar, the temperature was 80° C. and the reaction time was 1 hour. 203 mg of the catalyst was fed into the autoclave together with 3.55 ml of 1 wt % $Ph_3C^+$ $^-B(PhF_5)_4$, giving a B/Zr-ratio of 2. After 1 hour of polymerization, the yield of polyethylene was 2 g giving a catalyst activity of 0.01 kg PE/g cat h.

Example 17

Catalyst Preparation
Carrier Calcination
　Akzo alumina (grade B) is calcinated in a nitrogen flow at 300° C. for 10 hours
Trimethylaluminium Treatment of Alumina
　1.5 ml of 20 wt % TMA solution was added to 1 g of Akzo alumina, calcinated as above. After 2 hours, the methylated carrier was dried under a nitrogen flow. The Al content of the carrier was 2.84 mmol/g carrier.
Impregnation of Metallocene
　160 mg of rac-ethylene-bis(2-tert-butyldimethylsiloxy-indenyl) zirconium dichloride was dissolved in 2 ml of toluene. 1 ml of this solution was added to 1 g of previously prepared methylated alumina. After 2 hours, the catalyst was dried under a nitrogen flow. The catalyst has a Zr content of 1.0 wt %.
Test Polymerization
　Polymerization was carried out in a 3-liter Buchi autoclave in i-butane. The ethylene partial pressure was 5 bar, the temperature was 80° C. and the reaction time was 1 hour. 200 mg of the catalyst was fed into the autoclave together with 3.55 ml of 1 wt % $Ph_3C^+$ $^-B(PhF_5)_4$, giving a B/Zr-ratio of 2. After 34 minutes of polymerization, the yield of polyethylene was 214 g giving a catalyst activity of 1.89 kg PE/g cat h.
Polymer Properties
　Melt index MFR21 is 1.07, Mw=508000, Mw/Mn=9.8

Example 18

Catalyst Preparation
　Catalyst preparation as in Example 17
Test Polymerization
　Polymerization was carried out in a 3-liter Buchi autoclave in i-butane. The ethylene partial pressure was 5 bar, the temperature was 80° C. and the reaction time was 1 hour. 199 mg of the catalyst was fed into the autoclave together with 1.76 ml of 1 wt % $Ph_3C^+$ $^-B(PhF_5)_4$, giving a B/Zr-ratio of 1. After 1 hour of polymerization, the yield of polyethylene was 273 g giving a catalyst activity of 1.37 kg PE/g cat h.
Polymer Properties
　Melt index MFR21 is 1.169. Mw=321000, Mw/Mn=7.4

Example 19

Catalyst Preparation
Carrier Calcination
　As in Example 17
Trimethylaluminium Treatment of Alumina
　As in Example 17
Impregnation of Metallocene
　144 mg of rac-ethylene-bis (2-tert-butyldimethylsiloxy-indenyl) zirconium dimethyl was dissolved in 2.2 ml of toluene. 1.1 ml of this solution was added to 1 g of methylated alumina. After 2 hours, the catalyst was dried under a nitrogen flow. The catalyst has a Zr content of 1.0 wt %.
Test Polymerization
　Polymerization was carried out in a 3-liter Buchi autoclave in i-butane. The ethylene partial pressure was 5 bar, the temperature was 80° C. and the reaction time was 1 hour. 208 mg of the catalyst was fed into the autoclave together with 3.55 ml of 1 wt % $Ph_3C^+$ $^-B(PhF_5)_4$, giving a B/Zr-ratio of 2. After 1 hour of polymerization, the yield of polyethylene was 307 g giving a catalyst activity of 1.48 kg PE/g cat h.
Polymer Properties
　Melt index MFR21 is 5.9, Mw=224000, Mw/Mn=6.5

Example 20

Catalyst Preparation
Carrier Calcination
　As in Example 17
Trimethylaluminium Treatment of Alumina
　As in Example 17
Impregnation of Metallocene
　160 mg of rac-ethylene-bis(2-tert-butyldimethylsiloxy-indenyl) zirconium dichloride was dissolved in 2 ml of toluene. 1 ml of this solution was added to 1 g of previously prepared methylated alumina. After 2 hours, the catalyst was dried under a nitrogen flow. The catalyst has a Zr content of 1.0 wt %.
Impregnation of Cocatalyst
　67 mg $Ph_3C^+$ $^-B(PhF_5)_4$ was dissolved in 0.4 ml of toluene. 0.3 ml of this solution was added to 300 mg of previously prepared catalyst. This gives a B/Zr ratio of 2. After 2 hours, the catalyst was dried under a nitrogen flow.
Test Polymerization
　Polymerization was carried out in a 3-liter Buchi autoclave in i-butane. The ethylene partial pressure was 5 bar, the temperature was 80° C. and the reaction time was 1 hour. 200 mg of the catalyst was fed into the autoclave. After 1 hour of polymerization, the yield of polyethylene was 399 g giving a catalyst activity of 1.995 kg PE/g cat h.
Polymer Properties
　Melt index MFR21 is 6.5, Mw=190000 and Mw/Mn=4.9.

Example 21

Catalyst Preparation
Carrier Calcination
　As in Example 4
Trimethylaluminium Treatment of Silica
　As in Example 4
Impregnation of Metallocene
　145 mg of rac-ethylene-bis(2-tert-butyldimethylsiloxy-zirconium dimethyl was dissolved in 4 ml of toluene. 1.5 ml of this solution was added to 1 g previously prepared methylated silica. After 2 hours, the catalyst was dried under a nitrogen flow as in Example 1. The catalyst has a Zr content of 0.5 wt %.
Test Polymerization
　Polymerization was carried out in a 3-liter Buchi autoclave in i-butane. The ethylene partial pressure was 5 bar, the temperature was 80° C. and the reaction time was 1 hour. 198 mg of the catalyst was fed into the autoclave together with 3.73 ml of 3.15 wt % $B(PhF_5)_3$, giving a B/Zr-ratio of 30. After 1 hour of polymerization, the yield of polyethylene was 21 g giving a catalyst activity of 0.1 kg PE/g cat h.
Polymer Properties
　Melt index MFR21 is 9.458, Mw=162000, Mw/Mn=7.1

Example 22

Catalyst Preparation
Carrier Calcination
　As in Example 6.
Trimethylaluminium Treatment of Silica-alumina
　As in Example 6.
Impregnation of Metallocene
　1 ml of rac-ethylene-bis(2-tert-butyldimethylsiloxy-indenyl) zirconium dimethyl solution (prepared as in Example 21) was added to 1 g of methylated carrier. After 2 hours, the catalyst was dried under a nitrogen flow. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 200 mg of the catalyst was fed into the autoclave together with 3.75 ml of 3.15 wt % $B(PhF_5)_3$, giving a B/Zr-ratio of 30. After 1 hour of polymerization, the yield of polyethylene was 97 g giving a catalyst activity of 0.5 kg PE/g cat h.

Polymer Properties

Melt index MFR21 is 5.1, Mw=213000, Mw/Mn=5.3

Example 23

Catalyst Preparation

Carrier Calcination

As in Example 11

Trimethylaluminium Treatment of Alumina

As in Example 11

Impregnation of Metallocene 1 ml of rac-ethylene-bis(2-tert-butyldimethylsiloxy-indenyl) zirconium dimethyl solution (prepared as in Example 21) was added to 1 g of previously prepared methylated alumina. After 2 hours, the catalyst was dried under a nitrogen flow. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 200 mg of the catalyst was fed into the autoclave together with 3.75 ml of 3.15 wt % $B(PhF_5)_3$, giving a B/Zr-ratio of 30. After 1 hour of polymerization, the yield of polyethylene was 84 g giving a catalyst activity of 0.42 kg PE/g cat h.

Polymer Properties

Melt index MFR21 is 4.2, Mw=201000, Mw/Mn=6.1.

Example 24

Catalyst Preparation

Carrier Calcination

As in Example 17

Trimethylaluminium Treatment of Alumina

As in Example 17

Impregnation of Metallocene 66 mg of n-butylbis(cyclopentadienyl)zirconium chloride was dissolved in 1.5 ml of toluene. 1 ml of this solution was added onto 1 g of previously prepared methylated alumina. After 2 hours, the catalyst was dried under a nitrogen flow. The catalyst has a Zr content of 0.5 wt %.

Test Polymerization

Polymerization was carried out in a 3-liter Buchi autoclave in i-butane. The ethylene partial pressure was 5 bar, the temperature was 80° C. and the reaction time was 1 hour. 205 mg of the catalyst was fed into the autoclave together with 3.55 ml of 1 wt % $Ph_3C^+ {}^-B(PhF_5)_4$, giving a B/Zr-ratio of 2. After 1 hour of polymerization, the yield of polyethylene was 263 g giving a catalyst activity of 1.3 kg PE/g cat h.

Polymer Properties

Melt index MFR21 is 25, Mw=102000, Mw/Mn=2.1.

Example 25

Catalyst Preparation

Catalyst preparation as in Example 24

Test Polymerization

Polymerization was carried out in a 3-liter Buchi autoclave in i-butane. The ethylene partial pressure was 5 bar, the temperature was 80° C. and the reaction time was 1 hour. 206 mg of the catalyst was fed into the autoclave together with 1.76 ml of 1 wt % $Ph_3C^+ {}^-B (PhF_5)_4$, giving a B/Zr-ratio of 1. After 1 hour of polymerization, the yield of polyethylene was 219 g giving a catalyst activity of 1.2 kg PE/g cat h.

Polymer Properties

Melt index MFR21 is 17.31, Mw=111000, Mw/Mn=2.1.

Example 26

Catalyst Preparation

Catalyst preparation as in Example 20.

Test Polymerization

Polymerization was carried out in a 3-liter Buchi autoclave in i-butane. The ethylene partial pressure was 5 bar, the temperature was 80° C. and the reaction time was 1 hour. 196 mg of the catalyst was fed into the autoclave. 40 ml of hexene was used as a comonomer. After 1 hour of polymerization, the yield of polyethylene was 258 g giving a catalyst activity of 1.27 kg PE/g cat h.

Polymer Properties

Melt index MFR21 is 79.4, Mw=67500, Mw/Mn=3.3, Tm=120.3° C.

Example 27

Catalyst Preparation

Carrier Calcination

Akzo alumina (grade B was calcinated in nitrogen flow at 300° C. for 10 hours).

Trimethylaluminium Treatment of Alumina 1.5 ml of 20 w % we TMA solution was added onto 1 g of Akzo alumina, which has been treated as in example 11. After 2 hours, the methylated carrier was dried with nitrogen flow. Al content of carrier was 2.84 mmol/g carrier.

Impregnation of Non-metallocene Compound 51 mg of (1,5,7-triaza[4.4.0]bicyclo-dec-5-enyl) titanium chloride, $C_7H_{12}Cl_3N_3Ti$ was dissolved in 2 ml of toluene. 1 ml of this solution was added onto 1 g of previously prepared methylated alumina. After 2 hours the catalyst was dried with nitrogen flow. The catalyst has a Ti content 1.0 w %.

Impregnation of Cocatalyst 201 mg $Ph_3CB(PhF_5)_3$ was dissolved into 1.2 ml of toluene. 1.0 ml of this solution was added onto 1 g of previously prepared catalyst. This gives a B/Ti ratio of 2. After 2 hours the catalyst was dried with nitrogen flow.

Test Polymerisation

Polymerization was carried out in a 3-liter Buchi autoclave in i-butane. The ethylene partial pressure was 5 bar, the temperature was 80° C. and the reaction time was 1 hour. 263 mg of the catalyst was fed into the autoclave. After 1 hour of polymerisation the yield of polyethylene was 4 g giving a catalyst activity of 0.015 kg PE/g cat. /h (or 2.0 kg PE/g Ti/h, the Ti content of the catalyst was 0.8 wt %).

What is claimed is:

1. A process for the Preparation of an olefin polymerization catalyst material, said process comprising the steps of:

(a) treating a particulate support material with an alkylating agent;

(b) contacting the alkylating agent treated support material with a procatalyst comprising at least one ligand of formula 2:

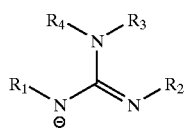

(2)

where groups $R_1$, $R_2$, $R_3$ and $R_4$ are the same or different and are selected from the group consisting of H, $C_1$–$C_{12}$ alkyl, alkenyl, aryl, alkylaryl, combinations thereof, bridged structures formed from $R_1$ to $R_4$ taken together, optionally the groups $R_1$, $R_2$, $R_3$ and $R_4$ comprising $SiH_3$, $SiH_2R_5$, $SiHR_6R_7$, and $SiR_8R_9R_{10}$ groups instead of one or more carbon atoms, wherein $R_5$–$R_{10}$ are selected from the group consisting of H, $C_1$–$C_{12}$ alkyl, alkenyl, aryl, and alkylaryl; optionally (c) contacting the support material with an ionic catalyst activator; and optionally (d) recovering the catalyst-carrying support material.

2. A process as claimed in claim 1 wherein the procatalyst is 1,5,7-triaza (4.4.0) bicyclodec-5-enyl.

3. A process as claimed in claim 1 wherein said support material is a porous acidic inorganic material.

4. A process as claimed in claim 3 wherein said support material is alumina or silica-alumina.

5. A process as claimed in claim 1 wherein said support material is heat treated prior to treatment with said alkylating agent.

6. A process as claimed in claim 1 wherein said alkylating agent is an organoaluminium compound.

7. A process as claimed in claim 1 wherein in step (c) said support material is contacted with a fluoroboron compound.

8. An olefin polymerization catalyst material comprising a procatalyst-loaded, alkylating agent pretreated particulate support material, said procatalyst being a procatalyst comprising at least one ligand of formula 2:

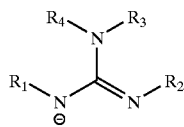

(2)

where groups $R_1$, $R_2$, $R_3$ and $R_4$ are the same or different and are selected from the group consisting of H, $C_1$–$C_2$ alkyl, alkenyl, aryl, alkylaryl, combinations thereof, bridged structures formed from $R_1$ to $R_4$ taken together, $SiH_3$, $SiH_2R_5$, $SiHR_6R_7$, and $SiR_8R_9R_{10}$ wherein $R_5$–$R_{10}$ are selected from the group consisting of H, $C_1$–$C_{12}$ alkyl, alkenyl, aryl, and alkylaryl.

9. A catalyst material as claimed in claim 8 wherein said support material is a porous acidic inorganic material.

10. A catalyst material obtainable by a process as claimed in claim 1.

11. A method of olefin polymerization wherein polymerization is effected in the presence of an olefin polymerization catalyst material comprising a procatalyst-loaded support material, characterised in that said support material comprises a procatalyst-loaded, alkylating agent pre-treated particulate support material, said procatalyst being a procatalyst comprising at least one ligand of formula 2

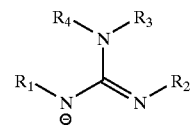

(2)

where groups $R_1$, $R_2$, $R_3$ and $R_4$ are the same or different selected from the group consisting of H, $C_1$–$C_{12}$ alkyl, alkenyl, aryl, alkylaryl or a combination of several such groups or $R_1$ to $R_4$ can also be taken together to form bridged structures, optionally the groups $R_1$, $R_2$, $R_3$ and $R_4$ comprising $SiH_3$, $SiH_2R_5$, $SiHR_6R_7$, $SiR_8R_9R_{10}$ groups instead of one or more carbon atoms, $R_5$ to $R_{10}$ being selected from the group consisting of H, $C_1$–$C_{12}$ alkyl, alkenyl, aryl, alkylaryl.

12. A method as claimed in claim 11 wherein an α-olefin is polymerized.

13. A method as claimed in claim 11 wherein a mixture of olefins is co-polymerized.

14. A method of olefin polymerization wherein polymerization is effected in the presence of an olefin polymerization catalyst material comprising a procatalyst-loaded support material where said procatalyst-loaded support material is a material obtainable by a process as claimed in claim 1.

15. A process as claimed in claim 2 wherein said support material is a porous acidic inorganic material.

16. A process as claimed in claim 2 wherein said support material is heat treated prior to treatment with said alkylating agent.

17. A process as claimed in claim 4 wherein said support material is heat treated prior to treatment with said alkylating agent.

18. A process as claimed in claim 5 wherein said alkylating agent is an organoaluminium compound.

19. A process as claimed in claim 18 wherein in step (c) said support material is contacted with a fluoroboron compound.

20. A method as claimed in claim 12 wherein a mixture of olefins is co-polymerized.

* * * * *